Jan. 13, 1942.  A. BARRY  2,269,573
ADJUSTABLE MEASURING WHEEL
Filed April 29, 1939  2 Sheets-Sheet 1
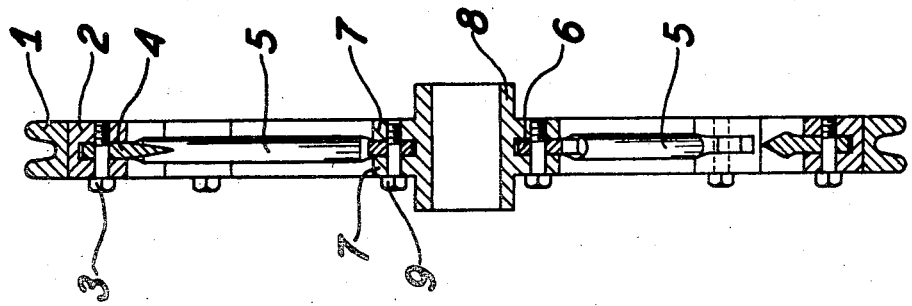
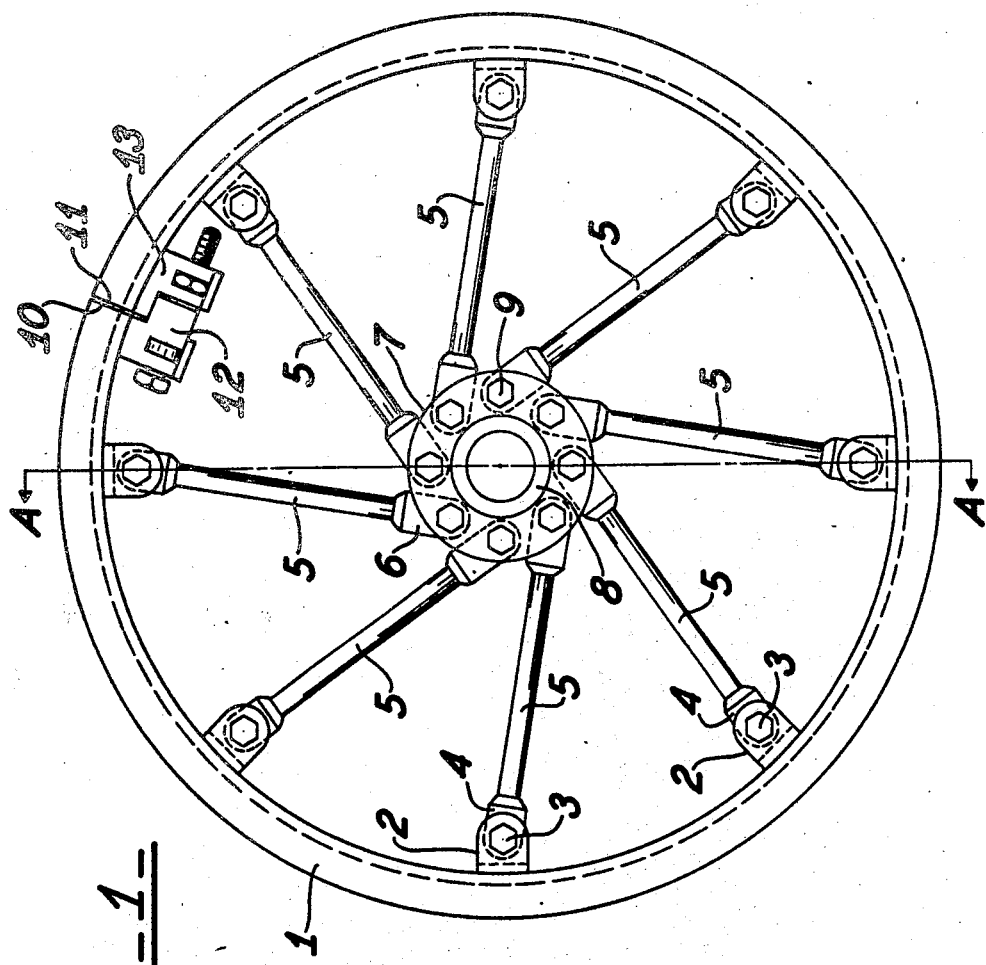
INVENTOR.
Adelbert Barry
BY
P. L. Young
ATTORNEY.

Jan. 13, 1942.  A. BARRY  2,269,573
ADJUSTABLE MEASURING WHEEL
Filed April 29, 1939   2 Sheets-Sheet 2
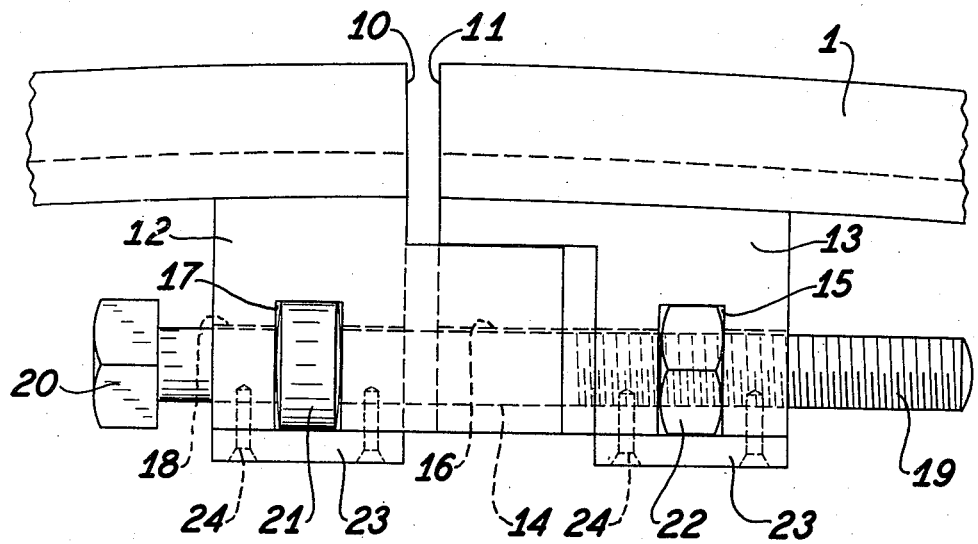
FIG_3_
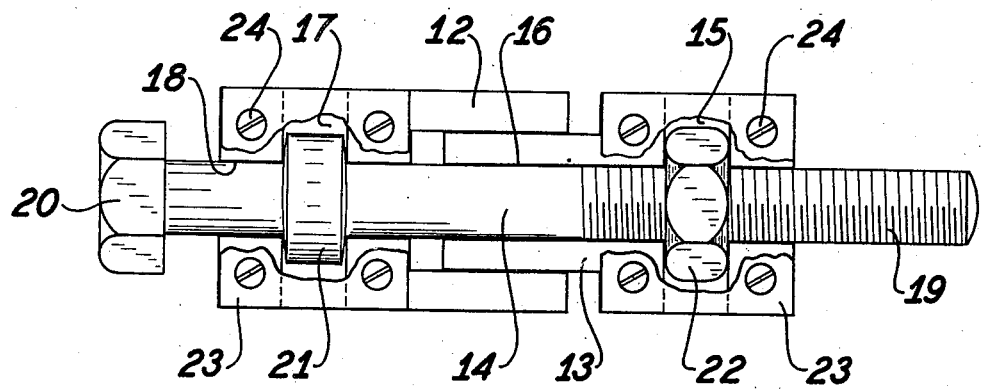
FIG_4_
INVENTOR.
Adelbert Barry
BY
P. L. Young
ATTORNEY.

Patented Jan. 13, 1942

2,269,573

UNITED STATES PATENT OFFICE 2,269,573

ADJUSTABLE MEASURING WHEEL

Adelbert Barry, Houston, Tex., assignor to Standard Oil Development Company, a corporation of Delaware Application April 29, 1939, Serial No. 270,754

3 Claims. (Cl. 33—129)

The present invention is directed to an adjustable measuring wheel which is particularly useful for lowering tools into bore holes, especially well logging instruments or other wire line instruments used in drilling operations, such as temperature measuring devices, coring devices and perforating devices.

It is well known in the art to use a wheel and a cable for measuring the depth of a bore hole. The rim of the wheel is grooved to fit snugly on any given cable and the hub is attached firmly to an axle which is geared with a tachometer or other recording apparatus. If the wheel is grooved to the right diameter, the number of feet of cable passing over the wheel into the bore hole will correspond exactly to the reading on the recording device.

Previous to the present invention, it was necessary to cut the groove in the rim a larger diameter than was correct and by taking minute cuts off the diameter finally arrive at the correct diameter. In this procedure, there is great difficulty in machining the wheel to an exact circumference. Furthermore, if the wheel has been worn down slightly, it cannot be accurately built up, so it must be discarded.

These difficulties are overcome by the adjustable measuring wheel of the present invention which comprises an expandable grooved rim with expanding means, the rim being connected to a hub by a plurality of spokes which are bolted to both the rim and the hub. These spokes are longer than the distance between the hub and the rim measured along a diameter of the wheel and they all form substantially the same angle with a diameter of the wheel passing through the point of attachment of the spoke with the rim. In manufacturing the adjustable measuring wheel a grooved rim slightly smaller than is correct is cut and then, by use of the expanding means of the wheel, it is possible to adjust it to the exact diameter needed and to readjust it from time to time as inaccuracies arise due to wear in either the cable or rim or both.

Further objects and advantages of the present invention will appear from the following description of the accompanying drawings in which Fig. 1 is a front elevation of the measuring wheel of the present invention;

Fig. 2 is a cross sectional view along the line A—A of Fig. 1;

Fig. 3 is a detail side view showing the means by which the circumference of the wheel is altered; and Fig. 4 is a bottom view of the posts shown in Fig. 3.

Referring to Fig. 1 in detail, numeral 1 is a spring steel rim on the inside of which are spaced a plurality of U-shaped shackles 2. Flattened ends 4 of spokes 5 fit into the U-shaped shackles 2 and are attached thereto by bolts 3. The other flattened ends 6 of spokes 5 fit snugly between flanges 7—7 of hub 8 and are attached to hub 8 by means of bolts 9, hub 8 being substantially in the center of the wheel. As may be seen from the drawings, the length of spokes 5 is somewhat greater than the distance between flange and shackles 2, as measured along the diameter of the wheel. This feature is provided to enable the wheel to be expanded, or contracted, as later described.

A cut is made through the rim, the sides of the cut being designated by numerals 10 and 11, and attached to the rim, one on each side, of the cut by welding or other suitable means are blocks 12 and 13. A bolt 14 passing through block 12 and screwing into block 13 holds the two sides fastened together and will be later described in greater detail.

In Figs. 2, 3 and 4, parts corresponding to Fig. 1 bear the same numerals.

In Fig. 3, block 13 is provided with a transverse slot 15 and a longitudinal slot 16. Block 12 is provided with a transverse slot 17 and a longitudinal slot 18.

As shown in Fig. 4, bolt 14, which is provided with threads 19 on one end and a hexagonal bolt head 20 on the other end, is provided with a circular flange 21 which is spaced near the bolt head 20. A standard nut 22 is screwed in place in threaded portion 19 of the bolt 14 which is then slipped into longitudinal slots 16 and 18. The flange 21 fits into slot 17 of member 12 and the nut 22 fits into slot 15 of member 13, both being held in place by plates 23 which, in turn, are held in place by screws 24. The plate 23 on block 13 holds nut 22 on bolt 14 from turning.

When it is desired to change the width of the slot between edges 10 and 11, the bolt 20 is turned. As the bolt is turned, pressure is exerted between flange 21 of the bolt and the walls of the slot 17. The nut 22 is unable to turn and causes the bolt to run back and forth on the threaded portion 19 which, in turn, causes the slot between edges 10 and 11 to be widened or narrowed according to the direction in which the bolt is turning. It can thus be seen that the turning of the bolt 14 enables the circumference of the rim to be adjusted to the desired value.

When it is desired to increase or decrease the circumference of the rim, the bolts 3 and 9 which hold the spoke ends to the rim and hub respectively are loosened. As the rim 1 expands, the spokes 5 turn on bolts 9 and assume positions nearer a center line drawn through the axis of the hub 8 and the various U-shaped shackles 2. At the same time, when the rim 1 is expanded pressure is exerted from the rim through the spokes to the hub and thence through opposing spokes back to the rim. The spokes being equally spaced around the rim and the hub distribute pressure to equally spaced areas of the rim and, by virtue of their greater strength, flex the rim into a circle concentric with the axis of the hub 8. After the adjustment is made, the bolts which hold the spokes are tightened, making a perfectly rigid wheel free from radial or axial play.

It is apparent that many changes can be made within the scope of the present invention and that the above description is merely illustrative of the preferred embodiment of it. Obviously, the size and the strength of the wheel could be varied according to the purpose and the weight of the instruments to be lowered. All such changes are contemplated within the purview of the appended claims in which it is intended to claim the above described invention as broadly as the prior art permits.

I claim:

1. A measuring wheel comprising a rim adapted to be expanded or contracted, a hub located substantially in the center of said wheel, a plurality of spokes, each spoke being longer than the distance between the hub and the rim measured along the radius of the wheel and attached to both the hub and the rim so that radii passing through corresponding ends of said spokes make angles with these spokes, the other ends of said spokes being spaced away from said radii in the same direction along the circumference of the wheel.

2. A measuring wheel comprising a rim open at one point of its circumference provided with a bolt attached to the rim at each side of said opening and capable of adjusting the width of the opening, a hub substantially in the center of the wheel, and a plurality of straight spokes, each spoke being longer than the distance between the hub and the rim measured along a radius of said wheel and attached to both the hub and the rim so that each spoke makes an angle with a radius of the wheel passing through the end attached to the hub and so that the ends of the spokes which are attached to the rim are all spaced away from said radii in the same direction along the circumference of the wheel.

3. A measuring wheel comprising a rim open at one point of its circumference provided with a bolt attached to the rim at each side of said opening and capable of adjusting the width of the opening, a hub substantially in the center of the wheel, and a plurality of straight spokes, the spokes all lying in a plane and each spoke being longer than the distance between the hub and the rim measured along a radius of said wheel, each spoke having one end attached to the hub and the other end attached to the rim by means which prevent relative movement between said ends and the parts to which said ends are attached, each spoke making an angle with a radius of the wheel which passes through the end of the spoke attached to the hub and the ends of the spokes which are attached to the rim, all being spaced away from said radii in the same direction along the circumference of the wheel.

ADELBERT BARRY.